(12) United States Patent
Wendt et al.

(10) Patent No.: US 6,953,394 B2
(45) Date of Patent: Oct. 11, 2005

(54) PROTECTIVE DEVICE FOR A HAND MACHINE TOOL

(75) Inventors: Dieter Wendt, Leinfelden-Echterdingen (DE); Juergen Schanbacher, deceased, late of Stuttgart (DE); Heidemarie Schanbacher, legal representative, Stuttgart (DE); Mike Voigt, Gaildorf (DE); Albert Kleider, Schwaebisch Hall (DE); Joachim Schadow, Dettenhausen (DE); Kurt Neef, Gaildorf-Grossaltdorf (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/363,096

(22) PCT Filed: Jun. 22, 2002

(86) PCT No.: PCT/DE02/02301
§ 371 (c)(1),
(2), (4) Date: Jun. 12, 2003

(87) PCT Pub. No.: WO03/004217
PCT Pub. Date: Jan. 16, 2003

(65) Prior Publication Data
US 2004/0157541 A1 Aug. 12, 2004

(30) Foreign Application Priority Data
Jun. 29, 2001 (DE) ........................................ 101 31 266

(51) Int. Cl.⁷ ................................................. B24D 1/04
(52) U.S. Cl. ...................... 451/352; 451/358; 451/359; 451/451; 83/478; 30/390
(58) Field of Search ................................ 451/352, 358, 451/359, 451; 83/478; 30/390–391, 124, 377

(56) References Cited

U.S. PATENT DOCUMENTS

| | | | | |
|---|---|---|---|---|
| 2,166,861 A | * | 7/1939 | Draheim | 451/358 |
| 2,828,784 A | * | 4/1958 | Damijonaitis | 30/376 |
| 3,585,980 A | * | 6/1971 | Mellor | 125/13.01 |
| 3,730,239 A | * | 5/1973 | Kaman et al. | 30/391 |
| 3,984,946 A | * | 10/1976 | Waters | 451/358 |
| 4,022,182 A | | 5/1977 | Lenkevich | |
| 4,414,743 A | * | 11/1983 | Pioch et al. | 30/124 |
| 4,450,627 A | * | 5/1984 | Morimoto | 30/391 |
| 4,561,324 A | * | 12/1985 | Hiramitsu et al. | 74/498 |
| 4,856,394 A | * | 8/1989 | Clowers | 83/56 |
| 5,113,951 A | | 5/1992 | Houben et al. | |
| 5,239,756 A | * | 8/1993 | Matzo et al. | 30/371 |
| 5,794,351 A | * | 8/1998 | Campbell et al. | 30/390 |
| 6,094,827 A | * | 8/2000 | Campbell | 30/390 |
| 6,155,916 A | * | 12/2000 | Rudolf et al. | 451/344 |
| 6,503,125 B1 | * | 1/2003 | Harrington | 451/28 |

FOREIGN PATENT DOCUMENTS

| | | |
|---|---|---|
| DE | 36 35 159 A1 | 4/1988 |
| DE | 88 03 627.8 | 6/1988 |
| DE | 42 38 564 A1 | 5/1994 |
| DE | 43 42 484 A1 | 4/1995 |
| DE | 201 00 307 U1 | 5/2001 |
| GB | 2 196 898 A | 5/1988 |
| WO | 95/08422 | 3/1995 |
| WO | 99/42263 | 8/1999 |

* cited by examiner

*Primary Examiner*—George Nguyen
(74) *Attorney, Agent, or Firm*—Michael J. Striker

(57) ABSTRACT

A guard device for a hand power tool, in the form of a sanding/grinding hand power tool, has a wheel guard enclosing at least part of a rotating tool in a radial direction; a guide for guiding the wheel guard along a work piece, and comprising a fastening device for mounting the wheel guard on the hand power tool, wherein the guide is joined with the wheel guard in torsion-resistant fashion, and the wheel guard is mounted in a fashion that allows it to move relative to the fastening device; and a depth-of-cut stop limiting the relative movement of the wheel guard and fastening device, and being lockable in position with positive engagement in preselected stepped positions.

18 Claims, 10 Drawing Sheets

PROTECTIVE DEVICE FOR A HAND MACHINE TOOL

BACKGROUND OF THE INVENTION

The invention is based on a guard device for a hand power tool, in particular for a sanding/grinding hand power tool, according to the preamble of claim 1.

Guard devices for hand power tools, in particular for angle grinders, are known, the wheel guards of which offer a certain level of protection during sanding/grinding work, but which do not support a sufficient level of dust removal. This is due to the fact that, during operation and in the idle position, the wheel guard covers only part of the side of the tool and, in particular, a sanding disc/grinding wheel of the hand power tool. The removal of sanding/grinding dust using vacuum is therefore only slightly effective, despite the powerful external vacuum cleaners that are typically used

ADVANTAGES OF THE INVENTION

The invention is based on a guard device for a hand power tool, in particular for a sanding/grinding hand power tool, comprising a wheel guard that is provided to enclose at least part of a rotating tool in the radial direction, and comprising a guide means for guiding the wheel guard along a work piece, as well as a fastening device for mounting the wheel guard on the hand power tool.

It is proposed that the guide means are joined with the wheel guard in torsion-resistant fashion, and the wheel guard is mounted in a fashion that allows it to move relative to the fastening device.

With a guard device of this type, a tool of a hand power tool, in particular a sanding/grinding hand power tool, can be enclosed by the wheel guard completely or to a predetermined extent, and, in fact, independent of the tool position relative to a work piece. As a result of this, an operator is protected to a large extent from particles that are removed from a work piece by the tool, i.e., sanding/grinding dust in particular. Additionally, sanding/grinding dust removal can be managed particularly effectively and, in most cases, neither an internal ventilator nor an external vacuum cleaner is required to remove dust. Due to the fact that the wheel guard is mounted in a fashion that allows it to move relative to the fastening device, the wheel guard is also mounted in a fashion that allows it to move relative to the tool position. As a result, the wheel guard can always lie on the work piece while the hand power tool is being operated, regardless of how far the tool enters the work piece. The guide means, which are interconnected with the wheel guard in torsion-resistant fashion, thereby guides the wheel guard along the work piece, by way of which it is ensured that the wheel guard bears against the work piece during operation without being able to tilt relative to the guide means. The wheel guard can therefore be held in a position that is constant relative to the surface of the work piece, independent of the depth of penetration of the tool in the work piece. Particles can therefore effectively be prevented from escaping from between the wheel guard and the surface of the work piece.

The invention is capable of being used particularly advantageously with a wheel guard for an angle grinder, since an angle grinder is used in mobile fashion and in various positions, e.g., in an overhead position. When the tool is completely enclosed or enclosed to a predetermined extent by the wheel guard, the operator is protected to a large extent from sanding/grinding dust.

The wheel guard encloses the tool in essential regions and, in particular, at least partially in the radial direction. In the case of a disc-shaped, rotating tool, at least one segment of the arc of the periphery of the tool is completely enclosed in the radial direction. Particles of the work piece being worked thrown off by the tool, such as sanding/grinding dust, are therefore captured by the wheel guard in the region in which it encloses the tool in the radial direction. Advantageously, the wheel guard encloses at least 120°, in particular at least 180° of the periphery of the tool, in order to capture as much dust as possible.

In an advantageous embodiment of the invention, the guide means comprise at least one sliding shoe. The wheel guard can be guided safely on the work piece on a sliding shoe that extends advantageously in the working direction of the tool. When the sliding shoe is designed with a flat bearing surface or bearing edge, the wheel guard is guided particularly safely over a flat work piece. By minimizing the guide means on a glide shoe that is seated tightly on the wheel guard, the wheel guard can be produced in a particularly lightweight and weight-saving fashion.

A particularly simple mounting of the wheel guard in a fashion that allows it to move relative to the fastening device is obtained by mounting the wheel guard in a fashion that allows it to swivel relative to the fastening device. The two elements can be interconnected at one center of rotation.

A particularly good level of sanding/grinding dust removal can be achieved when the wheel guard—in a state in which it lies on a flat work piece in the operating position—is provided to enclose the tool together with the work piece to an extent that does not depend on the depth of penetration of the tool in the work piece. The work piece can be enclosed entirely or to a predetermined extent, so that, when the tool is pulled out of the work piece, for example, no dust or no additional dust leaves the wheel guard and enters the surroundings.

Advantageously, an air-intake opening remains in the wheel guard or between the wheel guard and the work piece, the size of which is independent of the depth of penetration of the tool in the work piece. In this fashion, a constant flow of air—that is independent of the depth of penetration of the tool in the work piece—from the air-intake opening to a dust removal tube, and, therefore, constant dust removal, is made possible.

In a preferred embodiment of the invention, the guard device comprises a spring mechanism that presses the wheel guard against a work piece during operation. The wheel guard therefore lies on the work piece via the guide means, so that an undesired slit does not form between the wheel guard and the work piece through which the dust is carried out of the wheel guard.

A guard device, the wheel guard of which encloses the tool completely in the axial direction in the idle position, ensures a high level of work safety: an operator is protected effectively against injury caused by the tool. This also applies for a guard device, in the case of which the tool retracts completely into the wheel guard when it exits the work piece. Additionally, such a guard device ensures good protection against the release of sanding/grinding dust or particles. The dust rotating with the tool is drawn into the wheel guard along with the tool retracting into the wheel guard.

The wheel guard advantageously encloses two units that are movable relative to each other that, in mutual interplay, comprise an operating position and a tool replacement position, whereby at least one of the units, in the tool replacement position, exposes the tool in the axial direction to an extent that allows a tool to be replaced. With such an embodiment of the wheel guard, easy tool replacement is possible despite the fact that the tool is largely enclosed in the idle position. A design for this that is particularly simple is obtained by the fact that the two units are capable of being swiveled independently of each other around a common center of rotation relative to the fastening device. The two units are connected to the fastening device with a rivet or screw, for example. One of the units is a pivoted cover plate, for example. The arrangement of the pivoted cover plate to cover the axial side of the sanding disc/grinding wheel improves the work safety with the hand power tool and prevents sanding/grinding dust from escaping from the side, which makes it possible to replace the tool more quickly by swiveling the pivoted cover plate around a center of rotation. The pivoted cover plate can be closed particularly reliably and it is easy to open by means of the positive fastening system of the pivoted cover plate with lobes and snap-in tongues that snap in place together.

A further advantage is achieved in that the wheel guard comprises a window that allows an operator to see the tool and, in particular, on the side of the tool closest to a work piece. This makes it possible to control the position of the tool in the work piece particularly easily and effectively.

Advantageously, the wheel guard comprises an observation slit. It can be formed by means of an opening in the wheel guard, for example, or by means of a slant in a part of the wheel guard. The observation slit oriented toward the narrow side of the sanding disc/grinding wheel ensures a more controlled handling of the angle grinder with the wheel guard, mainly for exact placement of the sanding disc/grinding wheel in mortar joints. Visual control of the tool is particularly enhanced by means of the window in combination with an observation slit. The air-intake opening can be used as an observation slit. The air drawn in through the observation slit causes turbulence that essentially keeps the window free from dust. When the dust is removed from the opposite side of the window, e.g., by a dust removal tube located there, the air turbulence keeps the window essentially free from dust.

The guard device preferably comprises a dust removal tube, e.g., for connection to a dust removal device. Particles can be removed from the wheel guard particularly effectively through a dust removal tube. When the dust removal tube is mounted on the wheel guard, the dust removal tube is moved with the wheel guard. The dust removal tube is therefore in a constant position relative to the work piece, by way of which particularly good dust removal is possible.

The blow-off effect of the sanding/grinding dust is further improved by means of a damping plate located inside the wheel guard, since the air whirled by the rotating sanding disc/grinding wheel backs up there, and the air stream is directed out to the dust removal tube. The damping plate can be located on the side opposite the dust removal tube and it be integrally molded on the wheel guard, for example.

Depth-of-cut can be preselected particularly quickly by means of a depth-of-cut stop that snaps into place with positive engagement by pressing, sliding, or releasing the push button, and a preselected setting cannot be selected accidentally.

SUMMARY OF THE DRAWINGS

Further advantages result from the following description of the drawings. An exemplary embodiment of the invention is presented in the drawings. The drawings, the description, and the claims contain numerous features in combination. One skilled in the art will advantageously consider them individually as well and combine them into reasonable further combinations.

DESCRIPTION OF THE PREFERRED EMBODIMENTS

Figure 1:
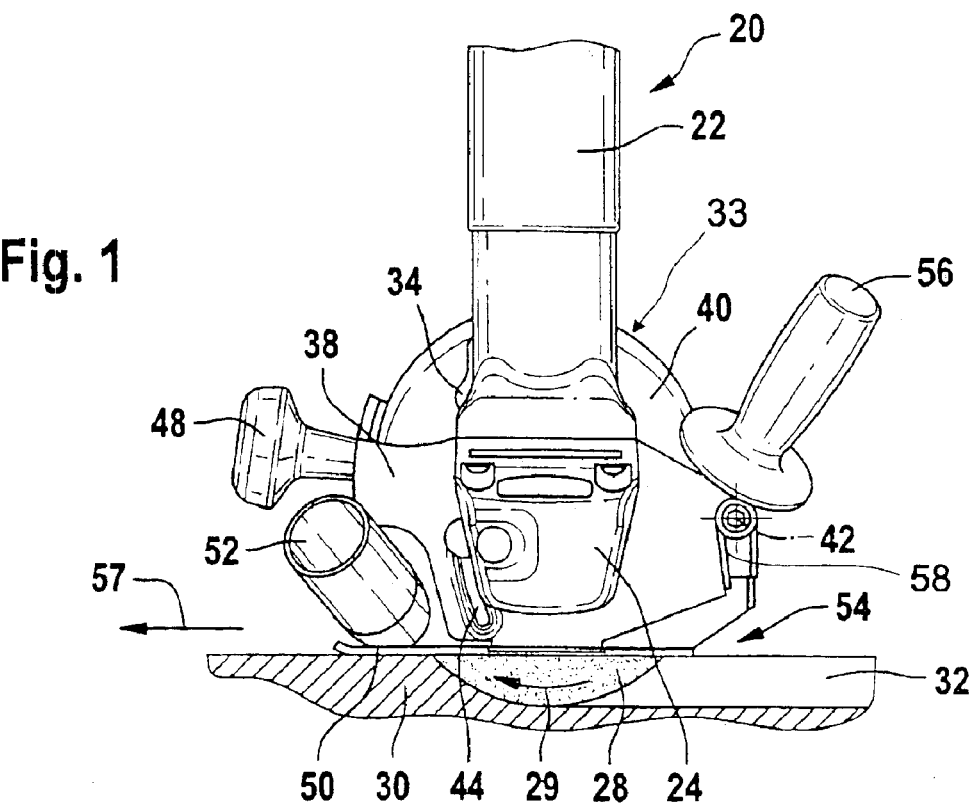
FIG. 1 is a top view of a hand power tool having a guard device according to the invention, in the working position.

FIG. 1 is the side view of an angle grinder 20, the motor housing 22 of which extends substantially upward at a right angle and contains a not-shown motor.

As viewed downward at a right angle, a gearbox housing 24 adjoins the motor housing 22, the driven shaft 26 (FIG. 13) of which said gearbox housing extends at a right angle to the plane of the drawing and has a tool mounted on its exposed end. The tool is a sanding disc/grinding wheel 28. It rotates in the direction of rotation 29 in the clockwise direction and plunges into a work piece 30, in which it cuts a groove 32 coming from the right.

As shown on the left side, a sliding button 34 of an on-and-off switch is mounted on the motor housing 22.

A guard device 33 is mounted on the angle grinder 20. It comprises a fastening device and a wheel guard 40. The fastening device is designed as a swiveling arm 38. The swiveling arm 38 is mounted via a well-fitting mounting opening 36 (FIG. 18) on a cylindrically-shaped, axial extension of the gearbox housing 24, i.e., the neck 25. The swiveling arm 38, in turn, is mounted on the wheel guard 40 and is capable of being swiveled upward and downward around a center of rotation 42 relative to the wheel guard 40. The swiveling arm 38 and the wheel guard 40 are reliably guided in opposition to each other by means of a guide bolt 46 seated on the wheel guard 40 in a guide slot 44 of the swiveling arm 38. As shown on the left side, the swiveling arm 38 has a knob 48 mounted on it, by way of which the angle grinder 20 with the wheel guard 40 can be guided on a work piece 30. Additionally, the knob 48 is grasped to manually adjust the depth of cut, whereby the swiveling arm 38 can be adjusted upward and downward. The wheel guard 40 is seated on the work piece 30 with a guide means, i.e., a rail 50 designed in the shape of a runner, located on its bottom side. The guide means ensures that the wheel guard 40 remains perpendicular to the surface of the work piece.

As shown on the bottom left, the wheel guard 40 has a dust removal tube 52 mounted on it directly adjacent to the rail 50. Dust created during sanding is removed through said dust removal tube, e.g., via an inserted tube piece and a dust suctioning device attached thereto. The dust removal tube 52 is situated at a 45° angle relative to the axis of rotation of the sanding disc/grinding wheel 28.

As shown on the bottom right, the wheel guard 40 is angled at a slant in the upward direction, so that an observation opening 54 is formed, through which the tool operator can control the engagement of the sanding disc/grinding wheel 28 in the work piece 30 and/or the groove 32. As shown at the top right, a handle 56 projects out of the wheel guard 40 at an angle, by way of which the unit comprising angle grinder 20 and wheel guard 40 can be comfortably guided along the work piece 30.

A spring mechanism is located between the swiveling arm 38 and the wheel guard 40 at the center of rotation 42. The spring mechanism comprises a preloaded leg spring 58 that tries to press the swiveling arm 38 upward. As a result, the angle grinder 20 must be moved relative to the wheel guard 40 according to FIG. 1 in a counterclockwise direction against the spring force of the leg spring 58 in order to reach its working position in which the sanding disc/grinding wheel 28 protrudes downward out of the pass-through slot 73 (FIG. 17) and/or past the rail 50 so that it can penetrate the work piece 30.

If the angle grinder 20 with the wheel guard 40 is lifted off of the work piece 30, the leg spring 58 pulls the wheel guard 40 downward relative to the swiveling arm 38, so that the sanding disc/grinding wheel 28 disappears completely inside the wheel guard 40.

The usual method of working with the angle grinder 20 is directed in the advancing direction 57, so that the movement of the work piece 30 relative to the sanding disc/grinding wheel 28 is opposite to the direction of rotation 29 of the sanding disc/grinding wheel 28.

Figure 2:
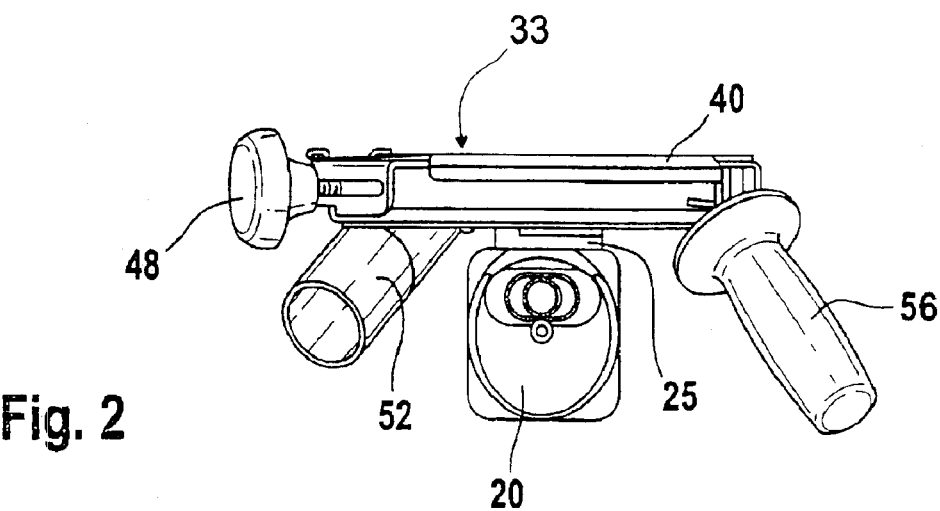
FIG. 2 is a view of the hand power tool in FIG. 1 from above.

The view from the top shown in FIG. 2 shows the slanted arrangement of the handle 56 on the wheel guard 40, and the slanted extension of the dust removal tube 52. Moreover, the neck 25 of the gearbox housing 24 is shown, which said neck engages in the mounting opening 36 of the swiveling arm 38.

Figure 3:
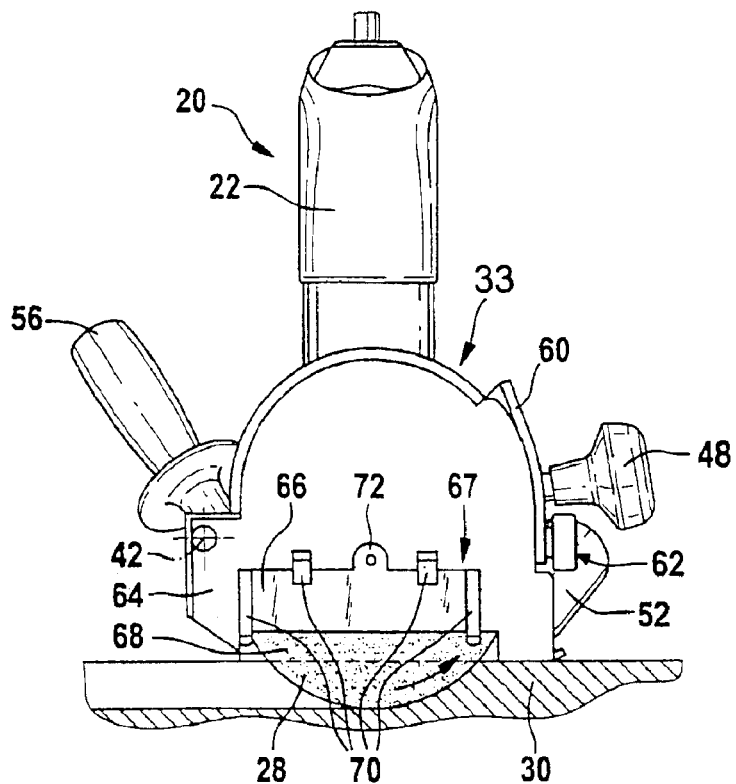
FIG. 3 is a view of the hand power tool in FIG. 1 from the opposite side.
Figure 14:
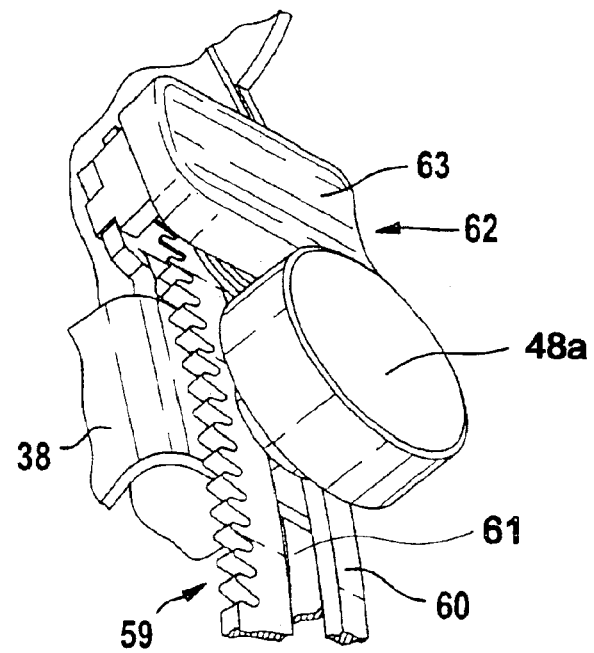
FIG. 14 is a view of the adjustable stop for limiting the depth of cut.
Figure 15:
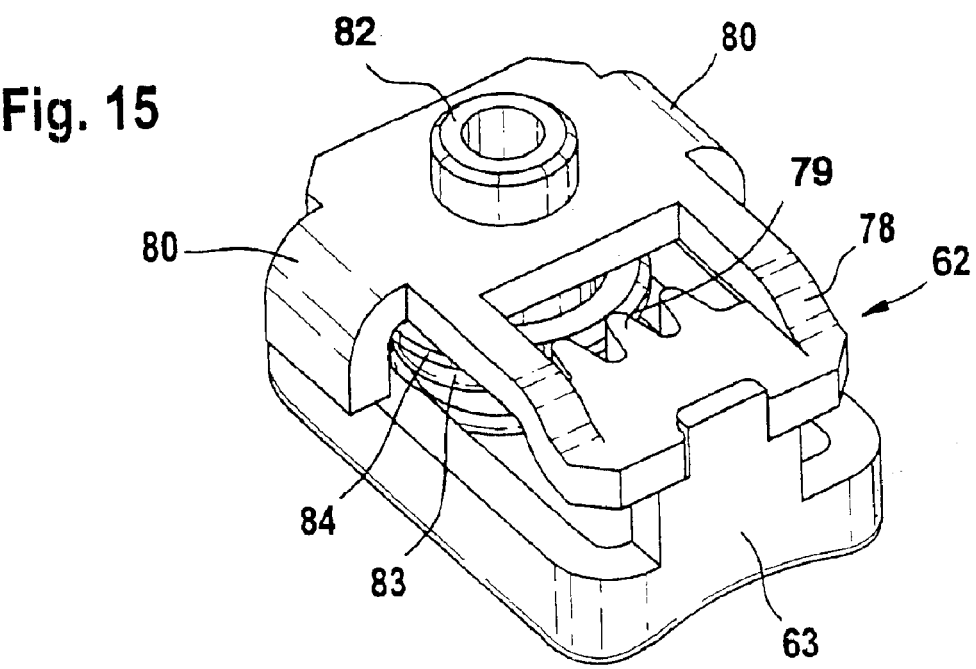
FIG. 15 is a detailed view of the depth-of-cut stop.

FIG. 3 shows the angle grinder 20 with wheel guard 40 according to FIG. 1 from the opposite side, also in the working position, with the sanding disc/grinding wheel 28 protruding far downward. A guide rule 60 is shown in FIG. 3, on which the knob 48 is guided and which can be locked in position by rotating it around its longitudinal axis. Furthermore, a depth-of-cut stop 62 is shown below the knob 48, which said depth-of-cut stop is also capable of being displaced in the guide rule 60 and which is capable of being locked in position with positive engagement in preselected, stepped positions by the press of a button. The depth-of-cut stop 62 is captively secured on the guide rule 60 (FIGS. 14, 15).

The guard device 33 comprises two units capable of being moved opposite to one another, i.e., the wheel guard 40 and a pivoted cover plate 64. The pivoted cover plate 64 is located on the opposite side of the swiveling arm 38 and is intended to cover the sanding disc/grinding wheel 68. The pivoted cover plate 64 is capable of being swiveled together with the wheel guard 40 around the center of rotation 42. To replace the sanding disc/grinding wheel 28, the pivoted cover plate 64 is swiveled toward the upper left—as viewed in this drawing—from the operating position into a tool replacement position. In this outwardly swiveled tool replacement position, the exposed end of the driven shaft 26 and/or the retaining nut 27 (FIG. 13) are easily accessible, so that, after the retaining nut 27 is loosened, the sanding disc/grinding wheel 28 can be removed in the axial direction out of the plane of the drawing.

In its lower region, the pivoted cover plate 64 comprises a window 66 in a rectangular opening. Located between the window 66 and the rail 50 is a lateral air-intake opening 68 through which air can pass that replaces the air blown out by the rotating sanding disc/grinding wheel 28 to remove sanding/grinding dust. Relative to the sanding disc/grinding wheel 28, the air-intake opening 68 is located opposite from the dust removal tube 52. In a state lying on the flat work piece 30 in the operating position, the air-intake opening 68 has a size that does not depend on the depth of penetration of the sanding disc/grinding wheel 68 in the work piece 30, since the rail 50—which, together with the wheel guard 40, borders the air-intake opening 68—always lies flat on the work piece 30 independent of the depth of penetration of the sanding disc/grinding wheel 28 in the work piece 30.

The window 66 is inserted in frame segments 70 fastened to the pivoted cover plate 64, and it engages with the pivoted cover plate 64 in captive fashion with a snap-in tongue 72 extending above it.

Figure 4:
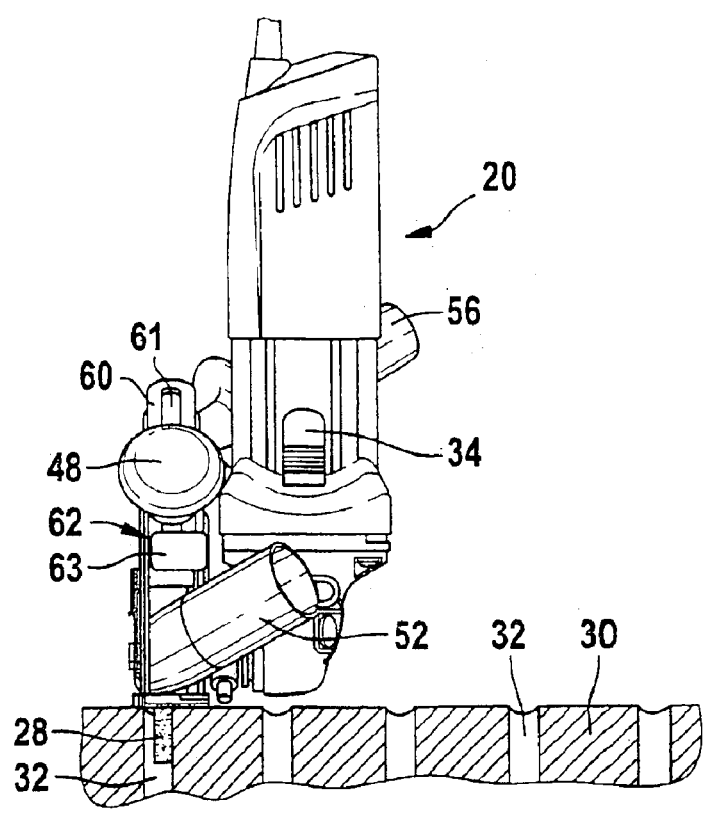
FIG. 4 is the view according to FIG. 3 rotated by 90° around the vertical axis.

FIG. 4 shows a side view, rotated by 90°, of the angle grinder 20 according to FIG. 3, whereby, in contrast to the preceding figures, the design of the guide rule 60 comprising a central slot 61—for swiveling the knob 48 vertically and/or for moving the depth-of-cut stop 62 with its push button 63—is shown. The sanding disc/grinding wheel 28 is also shown penetrating the groove 32, which said groove is designed as a mortar joint. The rest of the details explained hereinabove are labelled with reference numerals but will not be explained once more.

Figure 5:
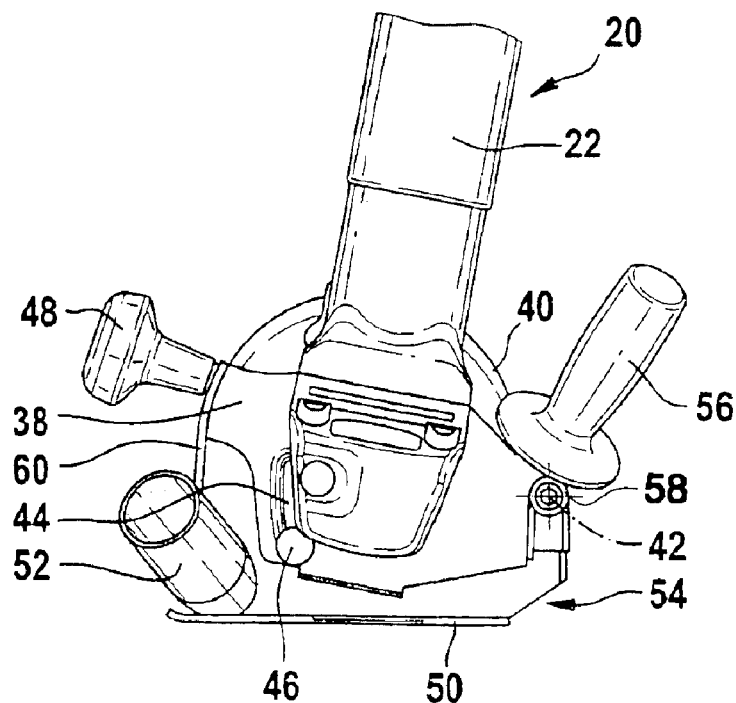
FIG. 5 is the view according to FIG. 1 in the idle position.

FIG. 5 shows the angle grinder 20 according to FIG. 1 with the wheel guard 40 in the idle position, in which the sanding disc/grinding wheel 28 has disappeared inside the wheel guard 40, because the swiveling arm 38 has been moved upward relative to the wheel guard 40. This is made particularly clear when the relative position of the guide bolt 46 to the guide slot 44 according to FIG. 5 is compared with said relative position of the guide bolt to the guide slot in FIG. 1.

Figure 6:
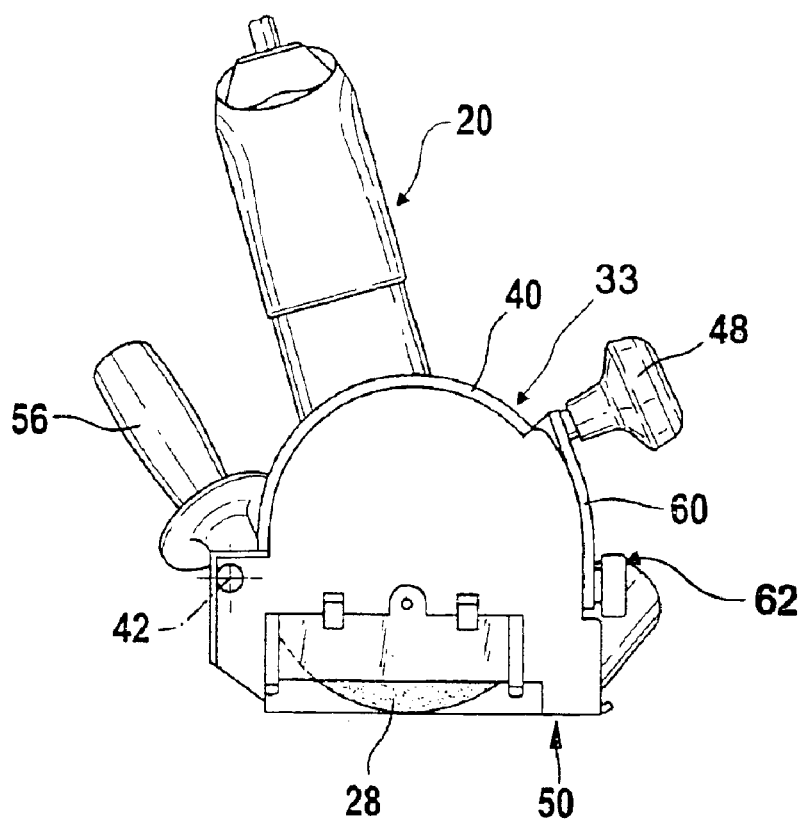
FIG. 6 is the view according to FIG. 5 from the opposite side.

FIG. 6 shows how the sanding disc/grinding wheel 28—located behind the rail 50—is, positioned within the contour of the wheel guard 40.

In FIGS. 5 and 6, the idle position of the wheel guard 40 is recognizable by the fact that the knob 48—as viewed here—is seated against the upper stop of the guide rule 60.

Figure 7:
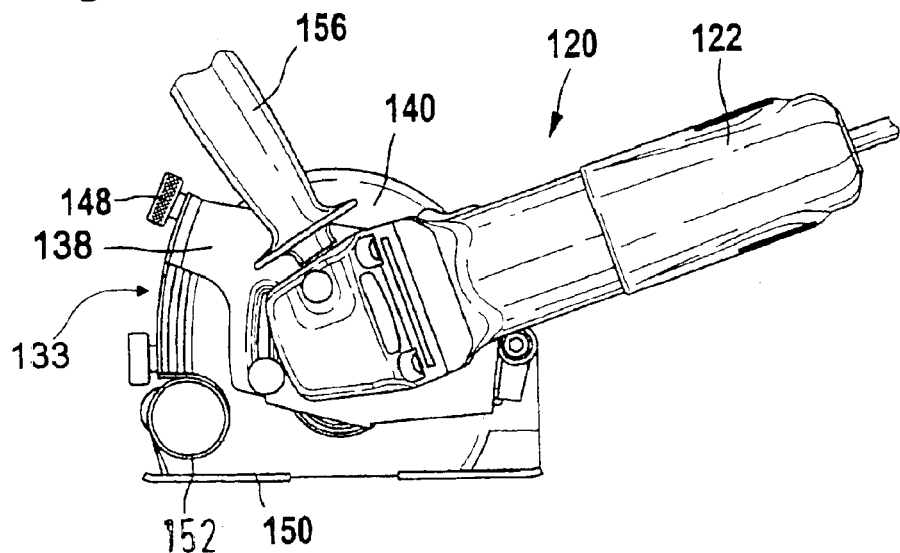
FIG. 7 is the side view of a further exemplary embodiment of a hand power tool having a guard device according to the invention, in the idle position.
Figure 8:
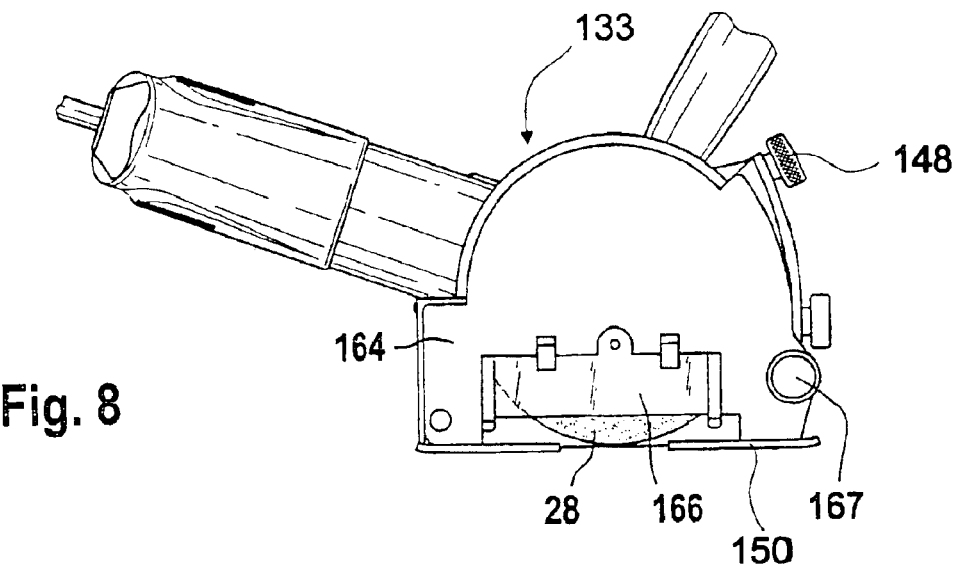
FIG. 8 is the view according to FIG. 7 from the opposite side.

FIGS. 7 and 8 show an exemplary embodiment that is slightly modified as compared with FIGS. 1 through 6, comprising a guard device 133, in the case of which a dust removal tube 152 projecting out of the wheel guard 140 at a right angle is provided, which said dust removal tube is provided for suctioning purposes using a separate vacuum cleaner. Moreover, an elongated, stem-like handle 156 is attached directly to the angle grinder 120 in order to make two-handed operation of the angle grinder 120 possible, whereby one hand can grasp the handle 156, and the other hand can grasp the motor housing 122. Moreover, the swiveling arm 138 is provided with a knurled nut 148 instead of a knob, with which said knurled nut the preselected depth of cut can be adjusted.

Figure 10:
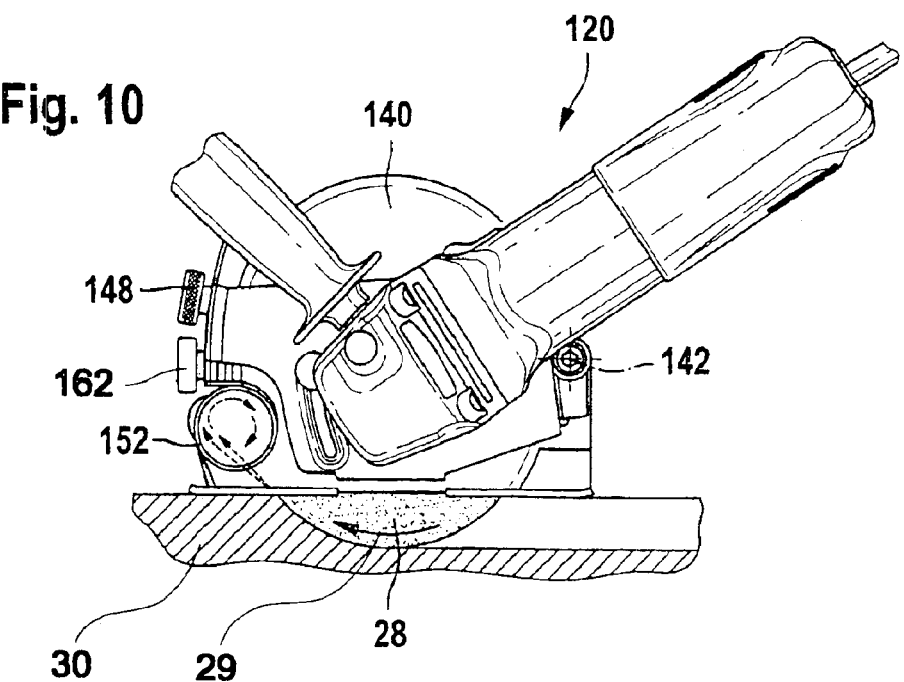
FIG. 10 is the view according to FIG. 7 in the working position.

Located on the underside of the wheel guard 140 is a rail 150 for guidance on a work piece 30 shown in FIG. 10.

FIG. 8 shows the view according to FIG. 7 from the opposite side, whereby, in contrast to FIG. 3 of the first exemplary embodiment, the window 166 is capable of being secured by means of a knurled nut.

Figure 9:
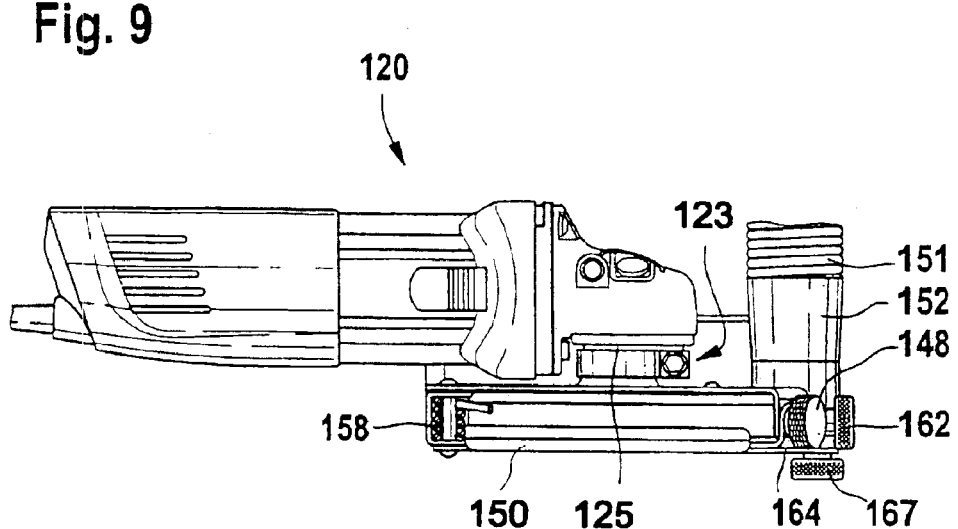
FIG. 9 is the view according to FIG. 8 rotated 90° around the longitudinal axis.

FIGS. 7 and 8 show the angle grinder 120 with the wheel guard 140 in the idle position, i.e., with the sanding disc/grinding wheel 28 drawn into the wheel guard 140, while FIGS. 9 and 10 show the same angle grinder 120 in the working position, i.e., with the sanding disc/grinding wheel 28 protruding below the rail 150.

FIG. 9 clearly shows a collet 123 that clamps a collar of the wheel guard 140 tightly against the neck 125 of the angle grinder 120. The wheel guard 140 is easy to remove by loosening a hexagon bolt and opening the collet 123 away from the neck 125 of the angle grinder 120 if the sanding disc/grinding wheel 28 was previously removed. Also shown are the knurled nut 167 for holding the pivoted cover plate 164 in position against the wheel guard 140, the knurled nut 148 for setting and releasing the preselected depth of cut, and the depth-of-cut stop capable of being adjusted using the knurled nut 162.

FIG. 9 clearly shows the leg spring 158, with which the angle grinder 120 is automatically moved relative to the wheel guard 140 around the center of rotation 142 into the idle position. Also shown is a suction tube 151 for connection to a vacuum cleaner, with which the sanding/grinding dust can be effectively removed.

FIG. 10 shows the angle grinder 120 in the working position, whereby sanding/grinding dust is thrown in the direction of rotation 29 of the sanding disc/grinding wheel 28 tangentially from the point where the sanding disc/grinding wheel 28 exits the work piece 30 and against the interior wall of the dust removal tube 152, and from there, it is capable of being suctioned off easily via the suction tube 151.

Figure 11:
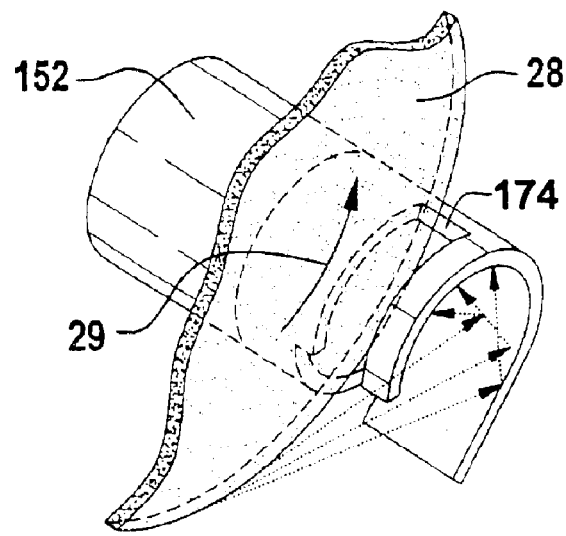
FIG. 11 is a detailed view of the dust removal tube according to FIGS. 7 and 10.

FIG. 11 shows a detained view of the dust removal tube 152 in its position relative to the sanding disc/grinding wheel 28. One can see that the radially outermost region of the sanding disc/grinding wheel 28 extends into an opening 174 of the dust removal tube 152. Part of the dust removal tube 152 therefore penetrates the planes—imagined to continue endlessly—of the two flat sides of the sanding disc/grinding wheel 28. The opening 174 is designed in such a fashion that part of the dust removal tube 152 reaches behind the sanding disc/grinding wheel 28. The opening 174 is therefore designed in the shape of a slot.

The conveying air stream produced by the sanding disc/grinding wheel 28—together with dust particles—meets the bent surface of the part of the dust removal tube 152 that penetrates the planes of the two flat sides of the sanding disc/grinding wheel 28, as indicated by the arrows. The conveying air stream with the sanding/grinding dust meeting this impact surface at a high rate of speed is further directed into the dust removal tube 152 in such a fashion that it executes a cyclone-like vortex motion in the dust removal tube. The conveying air and dust stream set into rotational motion in this fashion has sufficient kinetic energy to exit the dust removal tube 152 on its side furthest from the angle grinder 20 under its own power. A vacuum cleaner can be installed downstream for safety reasons, however, to prevent the dust removal tube 152 from becoming blocked in certain working positions of the angle grinder 120.

Figure 12:
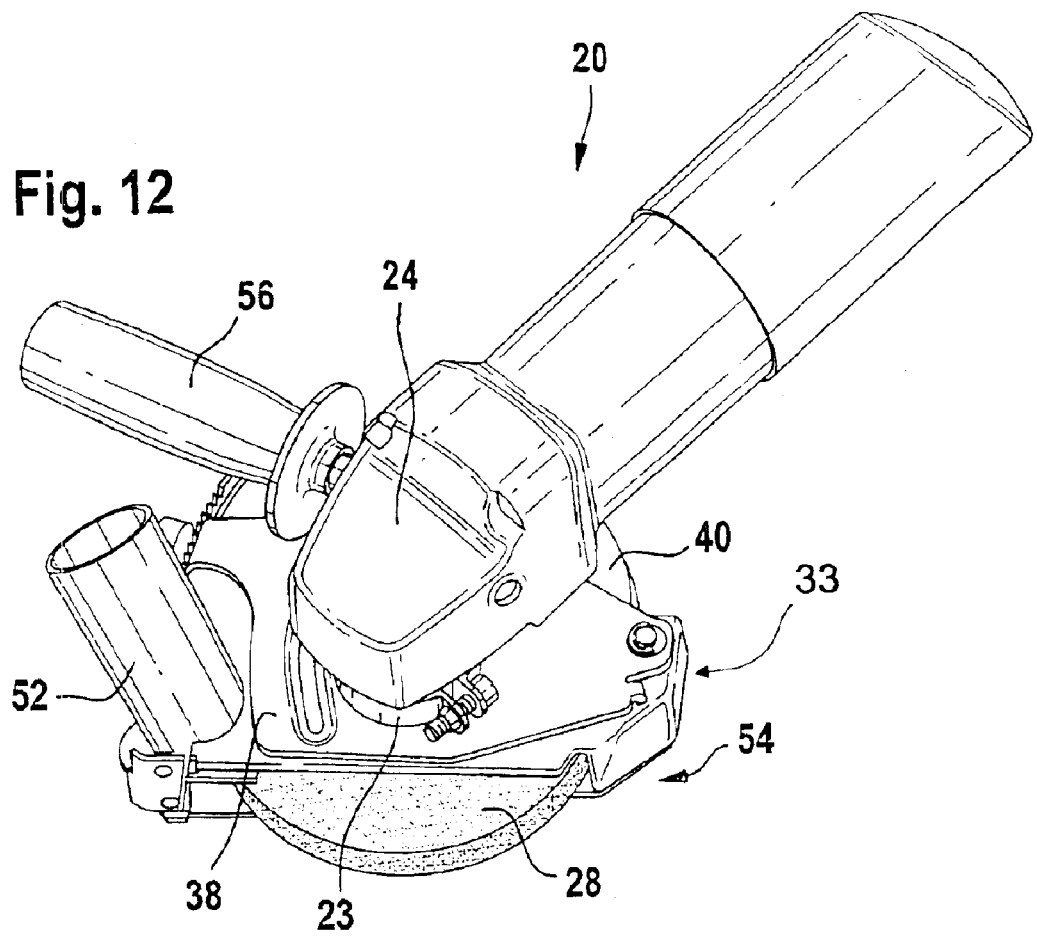
FIG. 12 is a spatial representation according to FIG. 1.

FIG. 12 shows a side view of a further exemplary embodiment, the design of which essentially matches that of the angle grinder 20 shown in FIGS. 1 through 4. The only differences are that the stem-like handle 56 is screwed directly onto the gearbox housing 24 of the angle grinder 20, and the knob is missing. The collet 23 and the locking screw that hold the angle grinder 20 tightly in position relative to the wheel guard 40 are particularly easy to see.

Figure 13:
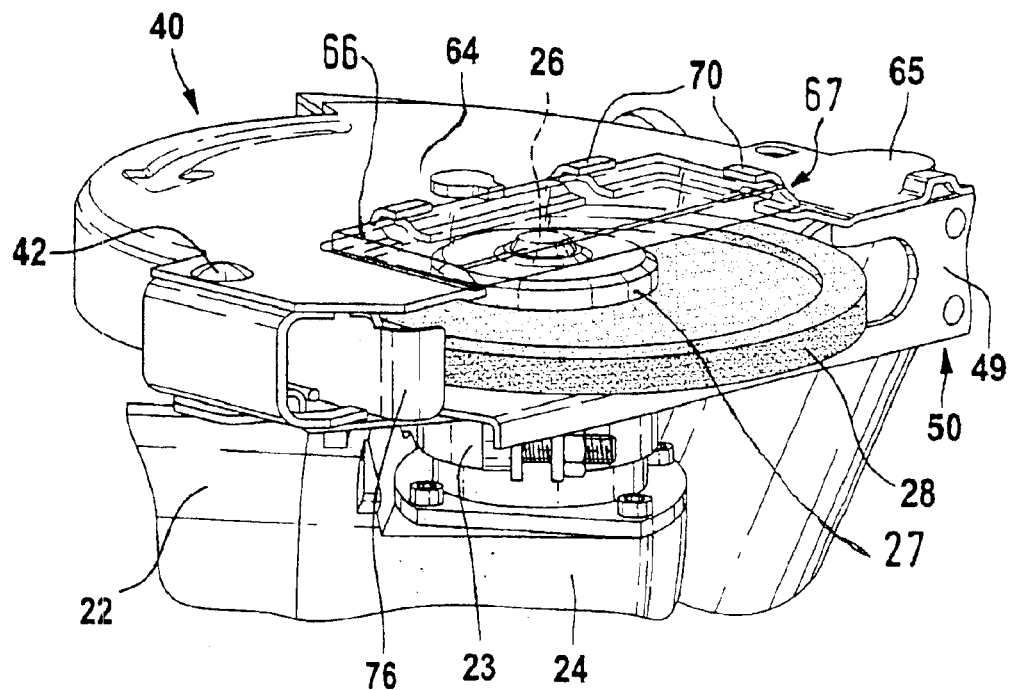
FIG. 13 is a spatial view from below according to FIGS. 1 and 2.

FIG. 13 shows a spatial representation nearly parallel to the sanding disc/grinding wheel 28 from the underside of the wheel guard 40. The embodiment of the rail 50 with a glide shoe 49 is shown particularly clearly. The rail 50 is located in the exit region of the wheel guard 40, where part of the sanding disc/grinding wheel exits the wheel guard 40 during operation. The glide shoe 49 of the rail 50 constricts the cross section of the exit region of the wheel guard 40. This helps the air stream in the wheel guard 40 along in the direction toward the dust removal tube 52.

As shown on the left side, a damping plate 76 is located next to the sanding disc/grinding wheel 28, which said damping plate extends radially very close to the periphery of the sanding disc/grinding wheel 28 and dampens a movement of air caused by the rotating sanding disc/grinding wheel 28 during sanding. As a result, a certain vacuum is produced inside the wheel guard 40, which said vacuum blows through the dust removal tube 52 and takes any sanding/grinding dust present along with it.

The collet 23 with the clamping nut for mounting the wheel guard 40 on the gearbox housing 24 is shown. On the top, the wheel guard 40 is covered horizontally with the pivoted cover plate 64 made of sheet metal, attached to which said pivoted cover plate—as shown on the right side—is a round, projecting swivel grip 65 to be operated using the thumb.

As shown on the left side, an arrow indicating the direction of rotation is stamped in the pivoted cover plate 64 that points to the left in the view shown. This is the intended direction of rotation for swiveling the pivoted cover plate 64 upward into its release position to remove the sanding disc/grinding wheel 28. Additionally, the arrow also indicates the direction of rotation of the sanding disc/grinding wheel 28. The pivoted cover plate 64 is swung to the left by approximately 180° around the center of rotation 42 so that the sanding disc/grinding wheel 28 can be exposed and replaced after the retaining nut 27 is removed.

The frame segments 70 for accommodating the window 66 in the corresponding opening are also clearly shown.

FIG. 14 shows the guide rule 60 as a fixed part of the wheel guard 40, relative to which the swiveling arm 38 can be adjusted via swiveling. The position of the swiveling arm 38 relative to the guide rule 60 can be fixed and/or released using the knurled thumb screw 48a and/or using the knob 48 shown in FIGS. 1 through 4 by turning them around their axes.

The push button 63 of the depth-of-cut stop 62 can be engaged in the toothed rack-like outer contour 59 by way of a mirror-image profile, and it can be disengaged with spring action by pressing on the push button 63. If pressure on the push button 63 is released, it automatically engages with its mating profile 79 in the toothed rack-like outer contour 59 in the respective position. The depth-of-cut stop 62 can be fixed in position at any position along the guide rule 60, so that the swiveling arm 38 with its knurled thumb screw 48a can only be swiveled up to said stop. With this, a reproducible depth of cut is established.

FIG. 15 shows a detained view of the depth-of-cut stop 62 with its push button 63 and a profile carrier 78 made of sheet metal that forms the mating profile 79 for engaging in the toothed rack-like outer contour 59 of the guide rule 60. A tab 80 is located on each of the opposite sides of the profile carrier 78, which said tabs fit in the center slot 61 of the guide rule 60 for guided engagement. The profile carrier 78 is penetrated transversely by a guide bolt 82, along which it can be moved toward the push button 63 and away from said push button. The push button 63 is preloaded elastically by means of a spiral-coiled spring 83.

The push button 63 and the profile carrier 78 are securely braced against each other, whereby, in the assembled state, the guide rule 60 runs along between the two. The spiral-coil spring 83 with a support disc 84 comes to bear at the top against the guide rule 60 and, when the push button 63 is operated, it moves in an axially spring-loaded fashion relative to the guide rule 60, so that the profile carrier 78 with its mating profile 79 can disengage from the outer contour 59 of the guide rule 60.

Figure 16:
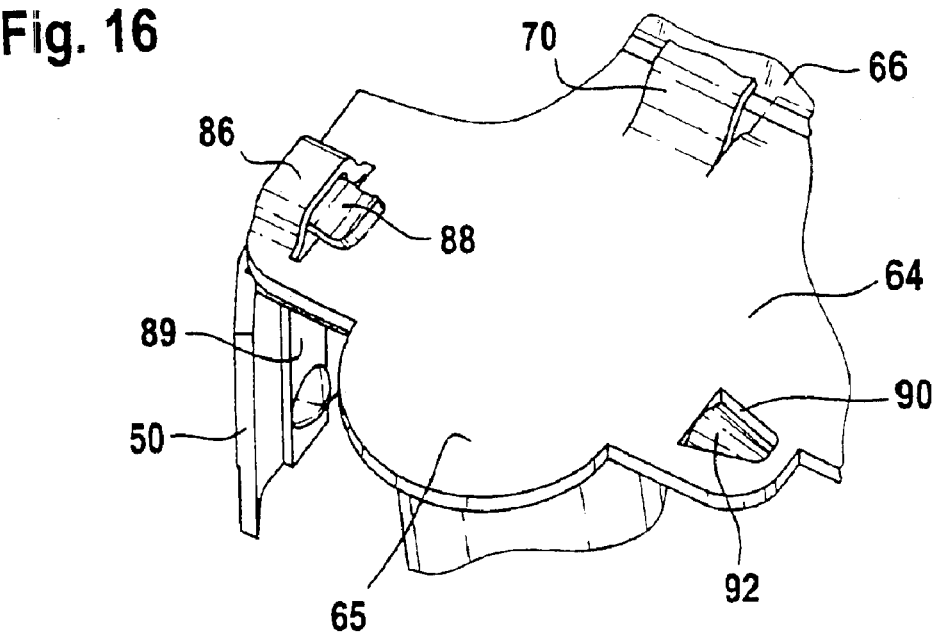
FIG. 16 shows a section of the pivoted cover plate.

FIG. 16 shows a section of a spatial representation of the swivel grip 65 of the pivoted cover plate 64. It is formed by part of the pivoted cover plate 64. As shown on the left, the pivoted cover plate 64 comprises a tab 86 bent outwardly upward, through which a flexible tongue 88 of an L-shaped leaf spring 89 extends, which said leaf spring is interconnected flatly with the rail 50, i.e., they are riveted together in this case.

One of the frame segments 70 into which the window 66 can be inserted is shown at the top.

An opening 90 in the pivoted cover plate 64 is shown on the right side, which said opening snaps into place over a detent lobe 92 that extends out of the adjacent side wall of the wheel guard 40. By swiveling the pivoted cover plate 64 to the right using the swivel grip 65 as viewed here, the tab 86 can glide over the flexible tongue 88, and the opening 90 can overcome the detent lobe 92, so that the pivoted cover plate 64 can then be rotated around the center of rotation 42 (FIG. 13) with minimum force.

Figure 17:
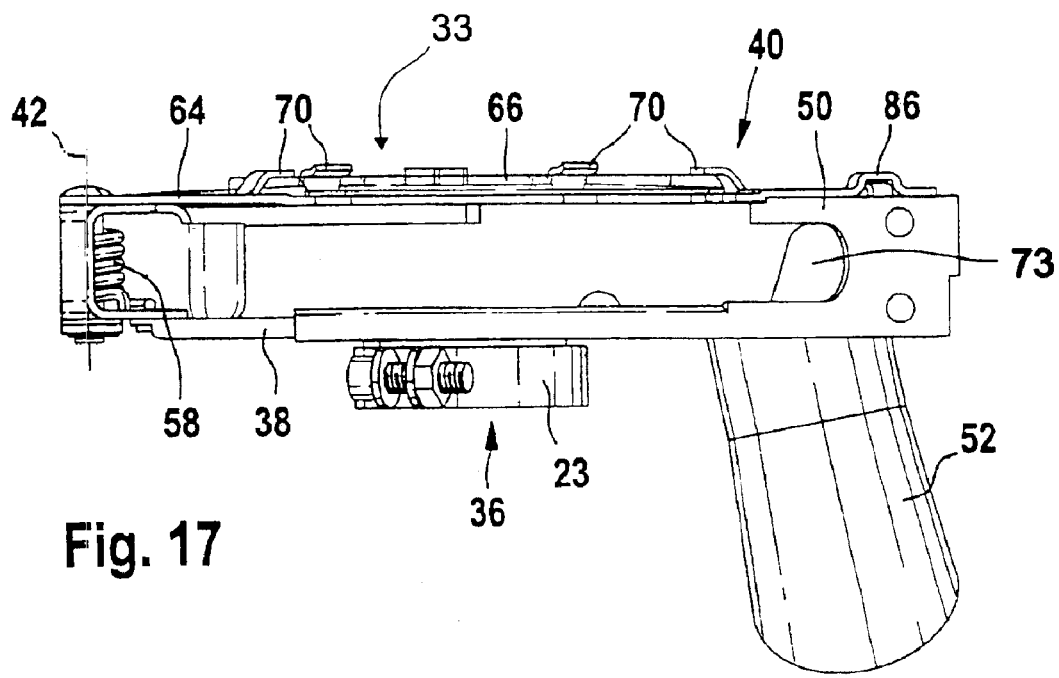
FIG. 17 is a bottom view of the angle grinder wheel guard according to FIG. 1.

FIG. 17 shows an underside view of the wheel guard 40 with the top view of the runner-like rail 50. Its surface forms a pass-through slot 73 through which the not-shown sanding disc/grinding wheel 28 can enter and exit.

Shown at the bottom is the collet 23 with the pass-through opening 36 for accommodating the neck 25 of the angle grinder 20 (FIG. 1). The leg spring 58 is shown at the outer left, which said leg spring tries to swivel the swiveling arm 38 around the center of rotation 42, while the dust removal tube 52 projects in the lower right-hand side of the drawing. The dust removal tube 52 tapers toward its mouth pointing toward the sanding disc/grinding wheel 28. As a result, the conveying air stream produced by the sanding disc/grinding wheel 28 flows rapidly in the axial direction of the dust removal tube 52 through the constriction in the mouth of the dust removal tube 52. It therefore leaves the inside of the wheel guard 40 at great speed, whereby it executes the rotational motion described with FIG. 11. Due to the widening of the dust removal tube in the direction away from the wheel guard 40, the air stream develops a suction effect due to its rotation, which said suction effect helps the air to exit the wheel guard and enter the dust removal tube 52.

The wheel guard 40 is covered on the top by the pivoted cover plate 64, the frame segments 70 of which project upwardly and hold the window 66. Additionally, the tab 86 is shown on the pivoted cover plate 64 at the top right.

Figure 18:
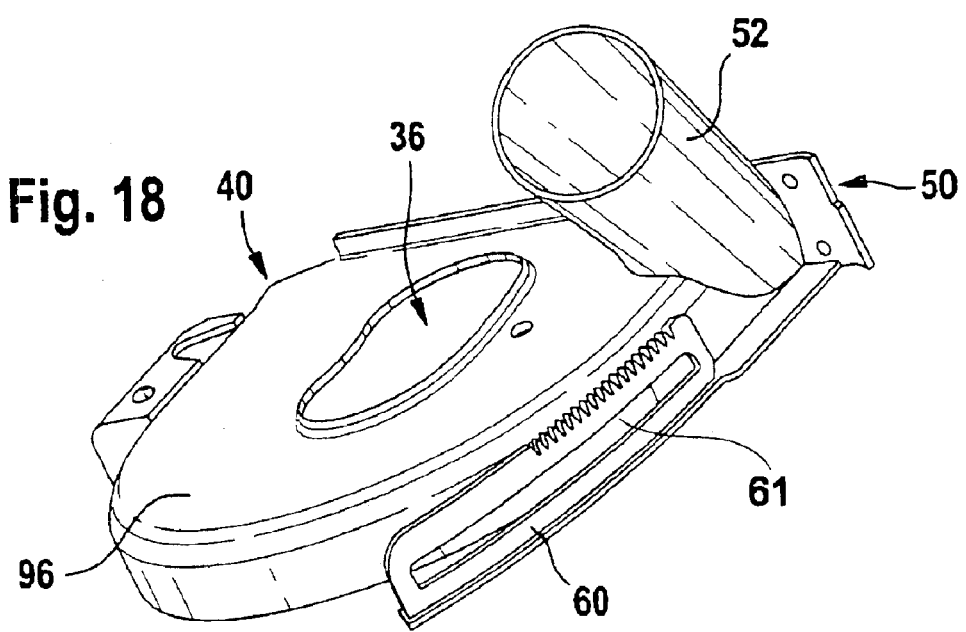
FIG. 18 shows a side shell of the wheel guard as seen from the outside.

FIG. 18 shows a detained view of the stationary, shell-like side part 96 of the wheel guard 40, to which the welded-on guide rule 60 is attached as shown on the right.

The runner-like region of the rail 50 and the dust removal tube 52 can be seen in the upper right. Shown particularly clearly here is the arrangement of the suction tube in the outermost corner of the wheel guard 40, at the site of origination of the sanding/grinding dust when the angle grinder 20 is used, through which said suction tube any sanding/grinding dust created moves by means of the high natural speed imparted by the sanding disc/grinding wheel 28 in conjunction with the blast air stream produced by the sanding disc/grinding wheel 28 itself.

Located approximately in the middle of the side part 96 is the pass-through opening 36, through which the neck 25 of the angle grinder 20 extends. The pass-through opening 36 is a slot that allows the angle grinder 20 and/or the neck 25 to swivel up and down relative to the wheel guard 40 until the maximum depth of cut is reached.

Figure 19:
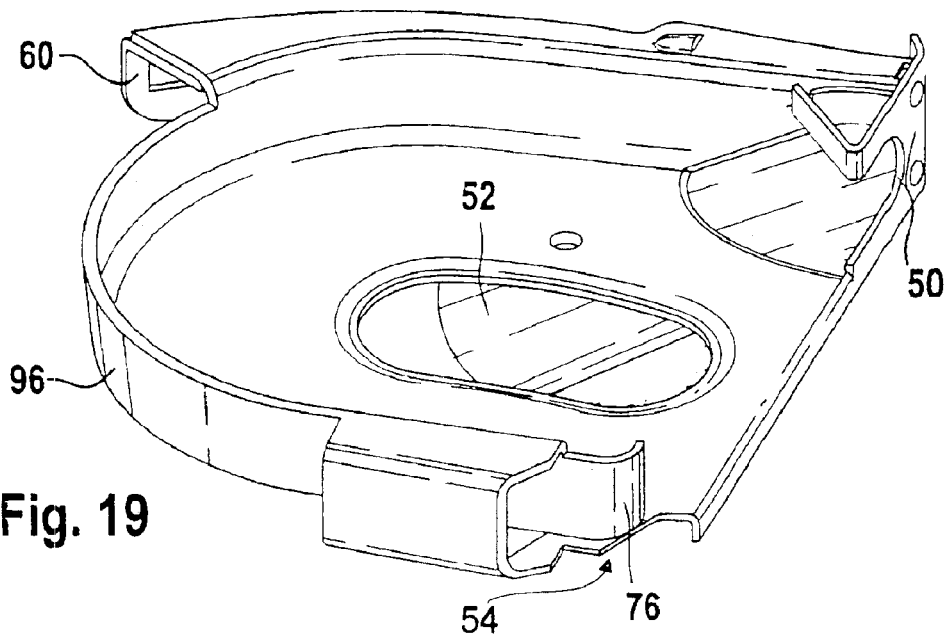
FIG. 19 shows the housing shell according to FIG. 18 as seen from the inside.

FIG. 19 shows the side part 96 as viewed from the inside, whereby the rail 50, the dust removal tube 52, and the guide rule 60 are shown particularly clearly. Moreover, the damper plate 76 and the observation opening 54 are shown on the outermost side of the side part 96.

Figure 20:
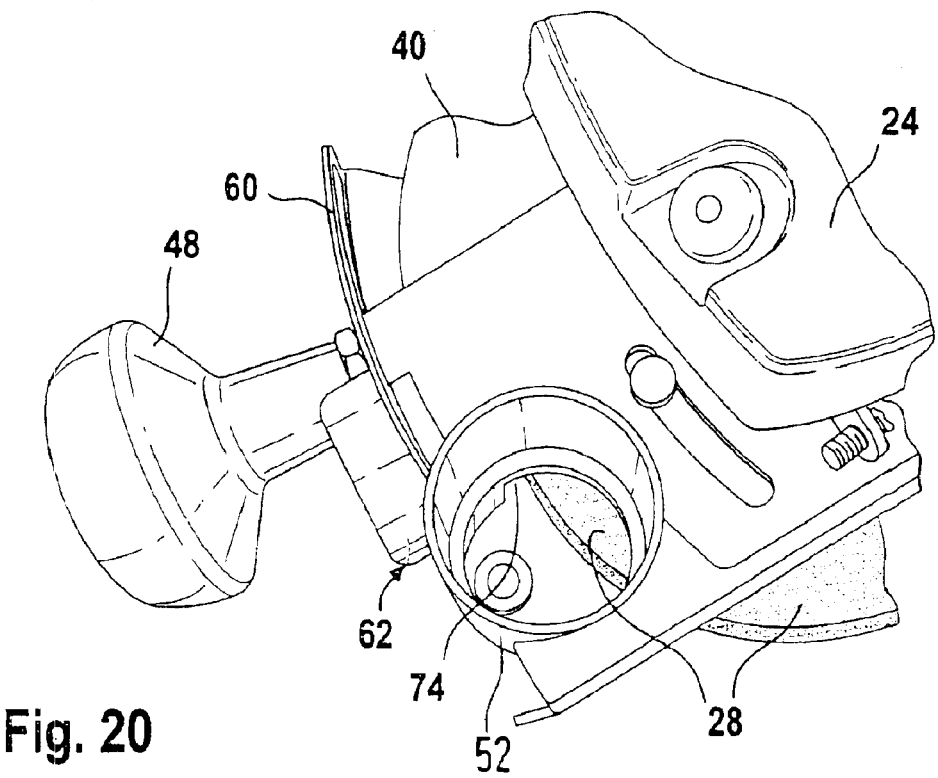
FIG. 20 is a spatial representation of the anterior region of the sanding/grinding machine comprising dust removal tube extending at a slant relative to the sanding tool.

FIG. 20 is a side view of the wheel guard 40 showing a section in the region of the gearbox housing 24 of the angle grinder 20. Also shown clearly is the knob 48 for guiding the wheel guard 40 and/or for adjusting a preselected depth of cut and the depth-of-cut stop 62. Also shown is the dust removal tube 52, in the circumferential contour of which the sanding disc/grinding wheel 28 passes through the opening 74 with its radially outermost region.

| Reference Numerals | |
| --- | --- |
| 20 | Angle |
| 22 | Motor housing |
| 23 | Collet |
| 24 | Gearbox housing |
| 25 | Neck |
| 26 | Drive shaft |
| 27 | Retaining nut |
| 28 | Sanding disc/grinding wheel |
| 29 | Direction of rotation |
| 30 | Work piece |
| 32 | Groove |
| 33 | Guard device |
| 34 | Sliding button |
| 36 | Mounting opening |
| 38 | Swiveling arm |
| 40 | Wheel guard |
| 42 | Center of rotation |
| 44 | Guide slot |
| 46 | Giude bolt |
| 48 | Knob |
| 48a | Knurled thumb screw |
| 49 | Glide shoe |
| 50 | Rail |

-continued

| Reference Numerals | |
|---|---|
| 52 | Dust removal tube |
| 54 | Obervation opening |
| 56 | Handle |
| 57 | Advancing direction |
| 58 | Leg spring |
| 59 | Outer contour |
| 60 | Guide rule |
| 61 | Slot |
| 62 | Depth-of-cut stop |
| 63 | Push button |
| 64 | Pivoted cover plate |
| 65 | Swivel grip |
| 66 | Window |
| 68 | Air-intake opening |
| 70 | Frame segment |
| 72 | Snap-in tongue |
| 73 | Pass-through slot |
| 74 | Opening |
| 76 | Damping plate |
| 78 | Profile carrier |
| 79 | Mating profile |
| 80 | Tab |
| 82 | Guide bolt |
| 83 | Spiral-coiled spring |
| 84 | Support disc |
| 86 | Tab |
| 88 | Flexible tongue |
| 89 | Leaf spring |
| 90 | Recess |
| 92 | Detent lobe |
| 96 | Side part |
| 120 | Angle grinder |
| 122 | Motor housing |
| 123 | Collect |
| 125 | Neck |
| 133 | Guard device |
| 138 | Swiveling arm |
| 140 | Wheel guard |
| 148 | Knurled nut |
| 150 | Rail |
| 152 | Dust removal tube |
| 156 | Handle |
| 158 | Leg spring |
| 162 | Knurled nut |
| 164 | Pivoted cover plate |
| 166 | Window |
| 167 | Knurled nut |
| 174 | Opening |

What is claimed is:

1. A guard device (33) for a hand power tool, in the form of a sanding/grinding hand power tool, comprising:
   a wheel guard (40) enclosing at least part of a rotating tool in a radial direction;
   a guide means for guiding the wheel guard (40) along a work piece (30), and comprising a fastening device for mounting the wheel guard (40) on the hand power tool, wherein the guide means are joined with the wheel guard (40) in torsion-resistant fashion, and the wheel guard (40) is mounted in a fashion that allows it to move relative to the fastening device;
   a depth-of-cut stop (62) limiting the relative movement of the wheel guard (40) and fastening device, and being lockable in position with positive engagement in pre-selected stepped positions; and
   means for forming a plurality of individual steps such that a part of said depth-of-cut is engageable into corresponding one of said individual steps to be locked in said steps with positive engagement in said predetermined stepped positions.

2. The guard device (33) according to claim 1, wherein the guide means comprise at least one glide shoe (49).

3. The guard device (33) according to claim 1, wherein the wheel guard (40) is mounted in a fashion that allows it to pivot relative to the fastening device.

4. The guard device (33) according to claim 1, wherein the wheel guard (40)—in a state in which it lies on a flat work piece (30) in the operating position—is provided to enclose the tool together with the work piece (30) to an extent that is independent of the penetration depth of the tool in the work piece (30).

5. The guard device (33) according to claim 1, characterized by a spring mechanism that presses the wheel guard (40) against a work piece (30) during operation.

6. The guard device (33) according to claim 1, wherein the wheel guard (40), in the idle position, encloses the tool completely in the axial direction.

7. The guard device (33) according to claim 1, wherein the wheel guard (40) comprises two units capable of being moved relative to each other that, in mutual interplay, comprise an operating position and a tool replacement position, whereby at least one of the units, in the tool replacement position, exposes the tool in the axial direction to an extent that allows a tool to be replaced.

8. The guard device (33) according to claim 7, wherein the two units are capable of being pivoted independent of each other around a common pivot (42) relative to the fastening device.

9. The guard device (33) according to claim 1, wherein the wheel guard (40)—in a state in which it lies on a flat work piece (30) in the operating position—comprises an air-intake opening (68), the size of which is independent of the depth of penetration by the tool in the work piece (30).

10. The guard device (33) according to 1, wherein the wheel guard (40) comprises a window (66) that ensures that the operator can see the tool.

11. The guard device (33) according to claim 1, characterized by a dust removal tube (52).

12. The guard device (33) according to claim 11, wherein the dust removal tube (52) is mounted on the wheel guard (40).

13. A hand power tool in the form of an angle grinder (20), comprising a guard device (33), wherein the guard device comprises a wheel guard (40) that is provided to enclose at least part of a rotating tool in the radial direction, and a guide means for guiding the wheel guard (40) along a work piece (30), and comprising a fastening device for mounting the wheel guard (40) on the hand power tool, wherein the guide means are joined with the wheel guard (40) in torsion-resistant fashion, and the wheel guard (40) is mounted in a fashion that allows it to move relative to the fastening device;
   a depth-of-cut stop (62) limiting the relative movement of the wheel guard (40) and fastening device, and being lockable in position with positive engagement in pre-selected stepped positions; and
   means for forming a plurality of individual steps such that a part of said depth-of-cut stop is engageable into corresponding one of said individual steps to be locked in said steps with positive engagement in said predetermined stepped positions.

14. A guard device (33) for a hand power tool in the form of a sanding/grinding hand power tool, comprising:
   a wheel guard (40) enclosing at least part of a rotating tool in a radial direction;
   guide means for guiding the wheel guard (40) along a work piece (30);
   a fastening device for mounting the wheel guard on the hand power tool, wherein the guide means are joined with the wheel guard (40) in a torsion-resistant fashion, and wherein the wheel guard (40) is mounted in a fashion that allows it to move relative to the fastening device, wherein the wheel guard (40) comprises a window (66) that ensures that an operator can see the tool and wherein the window (66) is made from a transparent material;

a depth-of-cut stop (62) limiting the relative movement of the wheel guard (40) and fastening device, and being lockable in position with positive engagement in pre-selected stepped positions; and means for forming a plurality of individual steps such that a part of said depth-of-cut stop is engageable into corresponding one of said individual steps to be locked in said steps with positive engagement in said predetermined stepped positions.

15. A guard device (33) for a hand power tool in the form of a sanding/grinding hand power tool, comprising:

a wheel guard (40) enclosing at least part of a rotating tool in a radial direction;

guide means for guiding the wheel guard (40) along a work piece (30);

a fastening device for mounting the wheel guard on the hand power tool, wherein the guide means are joined with the wheel guard (40) in a torsion-resistant fashion, wherein the wheel guard (40) is mounted in a fashion that allows it to move relative to the fastening device, and wherein the wheel guard (40) comprises an observation silt orientated toward the narrow side of a sanding/grinding wheel;

a depth-of-cut stop (62) limiting the relative movement of the wheel guard (40) and fastening device, and being lockable in position with positive engagement in pre-selected stepped positions; and means for forming a plurality of individual steps such that a part of said depth-of-cut stop is engageable into corresponding one of said individual steps to be locked in said steps with positive engagement in said predetermined stepped positions.

16. A guard device (33) for a hand power tool in the form of a sanding/grinding hand power tool, comprising:

a wheel guard (40) enclosing at least part of a rotating tool in a radial direction;

guide means for guiding the wheel guard (40) along a work piece (30);

a fastening device for mounting the wheel guard on the hand power tool, wherein the guide means are joined with the wheel guard (40) in a torsion-resistant fashion, wherein the wheel guard is mounted in a fashion that allows it to move relative to the fastening device;

a damping plate formed inside the wheel guard by sheet material of the wheel guard and backing up air whirled by a rotating sanding/grinding wheel;

a depth-of-cut stop (62) limiting the relative movement of the wheel guard (40) and fastening device, and being lockable in position with positive engagement in pre-selected stepped positions; and means for forming a plurality of individual steps such that a part of said depth-of-cut stop is engageable into corresponding one of said individual steps to be locked in said steps with positive engagement in said predetermined stepped positions.

17. A guard device (33) for a hand power tool in the form of a sanding/grinding hand power tool, comprising:

a wheel guard (40) enclosing at least part of a rotating tool in a radial direction;

guide means for guiding the wheel guard (40) along a work piece (30);

a fastening device for mounting the wheel guard on the hand power tool, wherein the guide means are joined with the wheel guard (40) in a torsion-resistant fashion, wherein the wheel guard is mounted in a fashion that allows it to move relative to the fastening device, and wherein the fastening device and the wheel guard (40) are guided relative to one another by means of a guide bolt (46) seated on the wheel guard (40) in a guide slot (44) of the fastening means;

a depth-of-cut stop (62) limiting the relative movement of the wheel guard (40) and fastening device, and being lockable in position with positive engagement in pre-selected stepped positions; and means for forming a plurality of individual steps such that a part of said depth-of-cut stop is engageable into corresponding one of said individual steps to be locked in said steps with positive engagement in said predetermined stepped positions.

18. A guard device (33) for a hand power tool in the form of a sanding/grinding hand power tool, comprising:

a wheel guard (40) enclosing at least part of a rotating tool in a radial direction;

guide means for guiding the wheel guard (40) along a work piece (30);

a fastening device for mounting the wheel guard on the hand power tool, wherein the guide means are joined with the wheel guard (40) in a torsion-resistant fashion, wherein the wheel guard (40) is mounted in a fashion that allows it to move relative to the fastening device, and wherein a knob is mounted on the fastening device for guiding the power tool on a work piece;

a depth-of-cut stop (62) limiting the relative movement of the wheel guard (40) and fastening device, and being lockable in position with positive engagement in pre-selected stepped positions; and means for forming a plurality of individual steps such that a part of said depth-of-cut stop is engageable into corresponding one of said individual steps to be locked in said steps with positive engagement in said predetermined stepped positions.

* * * * *